Aug. 24, 1948.   R. O. WILLIAMS   2,447,783
PLUG LOCKING ATTACHMENT FOR EXTENSION CORDS
Filed Dec. 28, 1944   3 Sheets-Sheet 1
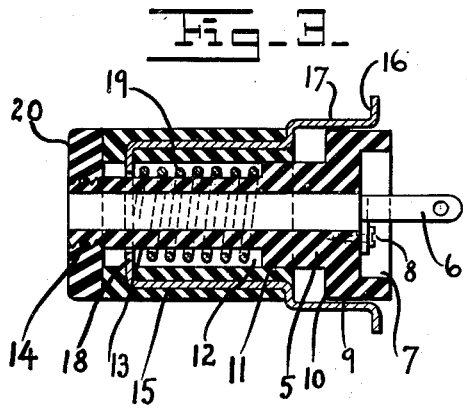
Fig-3-
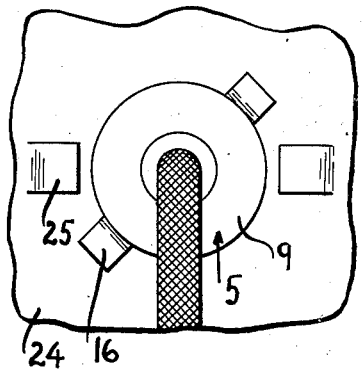
Fig-1-
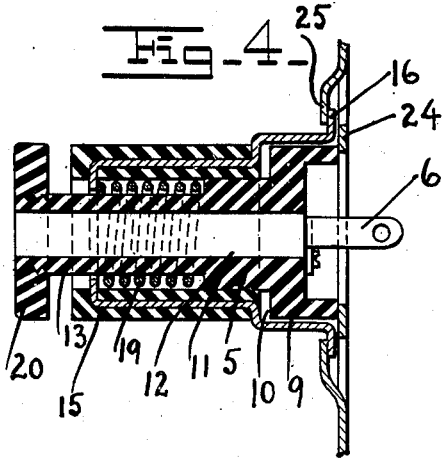
Fig-4-
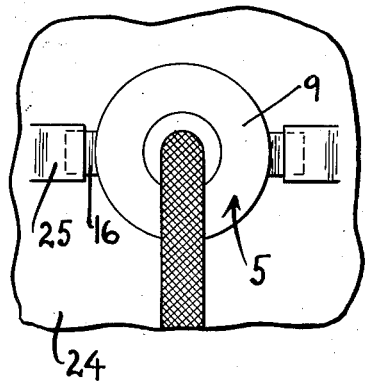
Fig-2-
*Inventor*
RICHARD O. WILLIAMS
By Clarence A. O'Brien
and Harvey B. Jacobson
*Attorneys*

Aug. 24, 1948.　　　　　R. O. WILLIAMS　　　　　2,447,783
PLUG LOCKING ATTACHMENT FOR EXTENSION CORDS
Filed Dec. 28, 1944　　　　　　　　　　　　　　　3 Sheets-Sheet 2
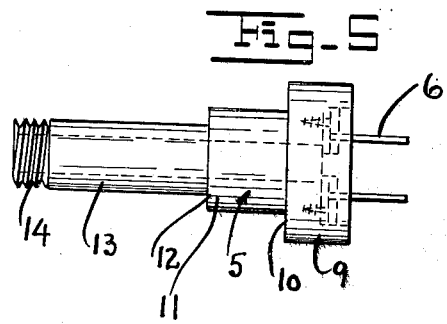
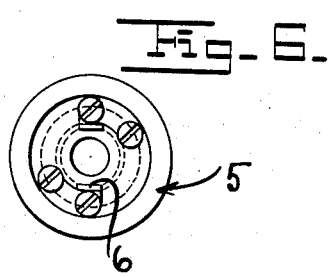
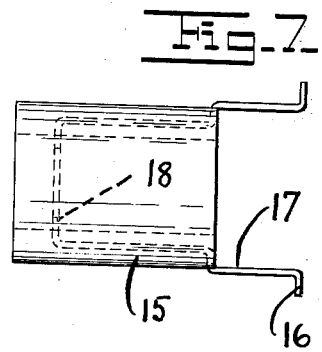
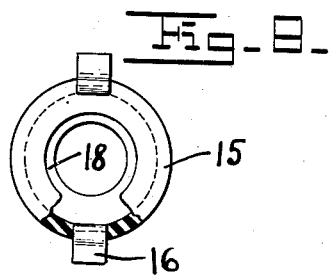
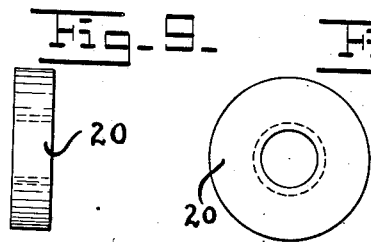
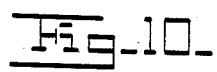
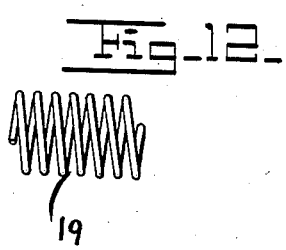
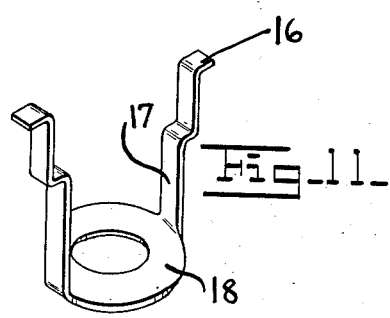
Inventor
RICHARD O. WILLIAMS
By *Clarence A. O'Brien
and Harvey B. Jacobson*
Attorneys Aug. 24, 1948.  R. O. WILLIAMS  2,447,783
PLUG LOCKING ATTACHMENT FOR EXTENSION CORDS
Filed Dec. 28, 1944  3 Sheets-Sheet 3

Inventor
RICHARD O. WILLIAMS
By *Clarence A. O'Brien
and Harvey B. Jacobson*
Attorneys Patented Aug. 24, 1948

2,447,783

UNITED STATES PATENT OFFICE 2,447,783

PLUG LOCKING ATTACHMENT FOR EXTENSION CORDS

Richard O. Williams, Los Angeles, Calif., assignor of one-half to Adolph H. Ross, Los Angeles, Calif.

Application December 28, 1944, Serial No. 570,152

1 Claim. (Cl. 173—330)

The present invention relates to new and useful improvements in plugs for extension cords, and the invention has for its primary object to provide means for locking the plug in an electric socket or fixture to prevent accidental disconnection of the plug.

More specifically, the invention embodies the provision of interengaging lugs carried by the plug and the cover plate of the electric socket and adapted for movement into and out of engagement with each other to secure the plug in position in the socket.

An important object of the present invention is to provide spring-biased means rotatably mounting the locking lugs on the plug and adapted upon partial rotary movement to move said lugs into and out of engagement with retaining lugs carried by the cover plate of the socket.

A still further object is to provide a plug and socket connecting means for extension cords of a simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary elevational view of the cover plate of an electric socket showing the plug in position for locking engagement therewith.

Figure 2 is a similar view showing the plug in locked position.

Figure 3 is a longitudinal sectional view of the plug detached from the socket.

Figure 4 is a similar view showing the plug in locked position with the cover plate of the socket.

Figure 5 is a side elevational view of the plug with the locking lugs removed therefrom.

Figure 6 is a front elevational view thereof.

Figure 7 is a side elevational view of the locking lugs and sleeve for slidably mounting the lugs on the plug.

Figure 8 is an end elevational view with parts broken away and shown in section.

Figure 9 is a side elevational view of the retaining nut for the sleeve of the locking lugs carried by the plug.

Figure 10 is a front elevational view thereof.

Figure 11 is a perspective view of the locking lugs removed from the sleeve.

Figure 12 is a side elevational view of the coil spring positioned between the plug and the locking lugs.

Figure 13:
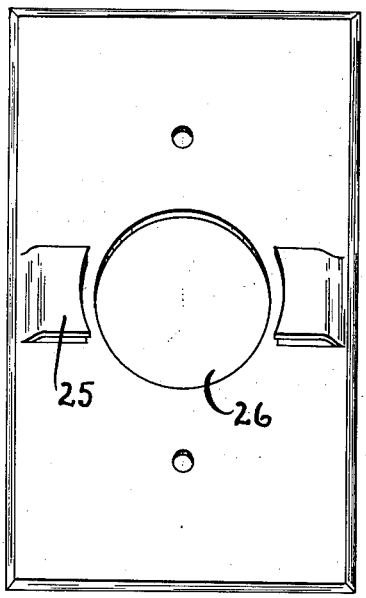
Figure 13 is a front elevational view of one form of cover plate for the electric socket.

Referring now to the drawings in detail, wherein for the purpose of illustration I have disclosed a preferred embodiment of the invention, the numeral 5 designates an electric plug of insulation material and tubular form and having the pair of conductor prongs 6 secured in a recess 7 at the inner end of the plug by means of the screws 8, the prongs being adapted for connection with the circuit wires extending longitudinally through the plug.

The outer surface of the plug 5 is of a substantially stepped formation to provide a flange 9 at the inner end of the plug to form a shoulder 10 and a flange 11 of reduced diameter outwardly of the flange 9 to form a shoulder 12, the outer portion of the plug extending from the shoulder 12 being in the form of a reduced stem 13 which is externally threaded at its outer end, as indicated at 14.

A sleeve 15 of insulation material is slidably mounted on the flanged portion 11 of the plug and surrounds the stem portion 13 thereof in spaced relation therefrom.

A pair of locking lugs 16 project outwardly in opposite directions from legs 17 embedded in the sleeve 15, the legs projecting beyond the inner end of the sleeve with their outer ends offset, as will be apparent from an inspection of Figures 3 and 4 of the drawings to extend along diametrically opposite sides of the flanged inner end portion 9 of the plug. The legs 17 are connected at their inner ends by a ring member 18 which is slidably mounted on the stem 13 and engaged by one end of a coil spring 19 which has its other end bearing against the shoulder 12 of the flange 11 of the plug, whereby to yieldably urge the sleeve 15 and lugs 16 outwardly on the plug. A nut 20 of insulation material is threaded on the outer end of the stem 13 to limit outward movement of the sleeve and to retain the same in position on the plug.

Figure 14:
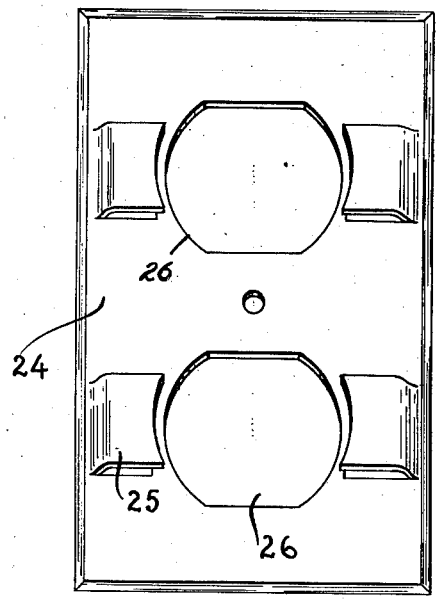
Figure 14 is a similar view of a modified form of cover plate.
Figure 15:
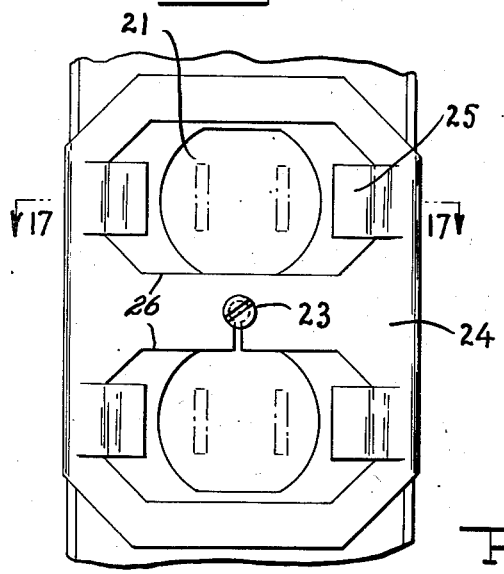
Figure 15 is a front elevational view showing the cover plate in position on the socket.
Figure 16:
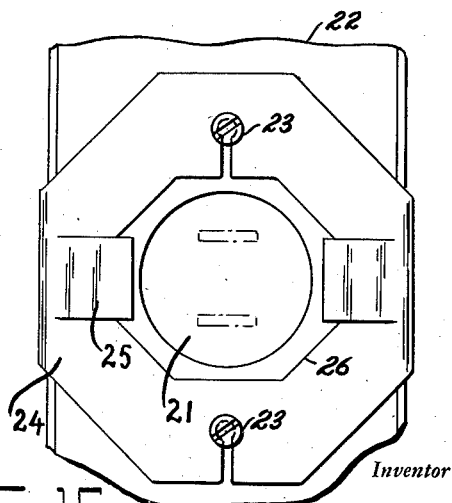
Figure 16 is a similar view illustrating a further modification of the cover plate.
Figure 17:
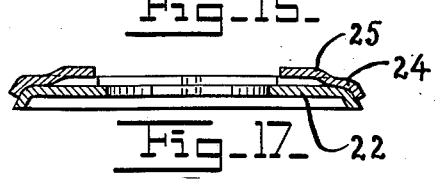
Figure 17 is a sectional view taken substantially on a line 17—17 of Figure 15.

The prongs 6 of the plug 5 are adapted for insertion in the usual electric socket or outlet, such as shown at 21 in Figures 13 and 16, the socket usually being provided with a cover plate 22 retained in position by one or more screws 23. Positioned over the cover plate 22 is a retaining plate 24 held in position by the screws 23, the retaining plate being either of a rectangular form, as illustrated in Figures 1, 2 and 13, with a single socket opening 26 therein, or of a skeleton polygonal form with a single socket opening 26, as illustrated in Figure 16, or of a rectangular form with two socket openings 26, as illustrated in Figure 14, or of skeleton polygonal form with two socket openings 26 as illustrated in Figure 15.

In each of the forms of the retainer plate a pair of lugs 25 are struck from the surface thereof at diametrically opposite sides of the opening 26 formed therein for exposing the socket 21, the lugs having a free edge disposed adjacent the opening and behind which the lugs 16 carried by the plug 5 are adapted for engagement by a partial rotation of the sleeve 15.

Accordingly, in the operation of the device, the prongs 6 of the plug 5 are inserted in the socket 21 and the sleeve 15 moved inwardly along the plug 5 and then partly rotated to move the lugs 16 carried by the sleeve under the lugs 25 carried by the retainer plate 24, whereby the plug will be locked in position to the retainer plate, as shown in Figure 4 of the drawings.

The spring 19 urges the plug 5 inwardly and at the same time urges the sleeve 15 and lugs 16 outwardly to prevent accidental displacement or separation of the plug from the socket.

It is believed that the details of construction and manner of use of the device will be readily understood from the foregoing without further detailed explanation.

Having thus described the invention, what I claim is:

Means for locking an electric plug in an outlet socket having a retaining plate attached thereto with outwardly projecting lugs, said plug comprising a tubular body having a pair of stepped flanges and provided with end prongs for insertion in said socket, a sleeve endwise slidable in opposite directions on said body and rotatable thereon, a pair of legs extending part way through said sleeve longitudinally thereof upon opposite sides of the same and having right angled outer ends extending out of said sleeve for engaging behind said lugs upon rotation of the sleeve, a ring in said sleeve concealed thereby and connecting said pair of legs at the inner ends thereof and slidably and rotatably mounted on the body, and a coil spring concealed in said sleeve and surrounding said body between one of the flanges thereof and said ring and urging said sleeve endwise in one direction, said sleeve being endwise slidable in the opposite direction in opposition to said spring to move said outer ends of the legs into a position for rotation to engage behind said lugs, the other of said flanges limiting such sliding of said sleeve in said opposite direction, and a nut on said body for engaging said sleeve to limit sliding of the sleeve in said one direction.

RICHARD O. WILLIAMS.

REFERENCES CITED

The following references are of record in the file of this patent:

UNITED STATES PATENTS

| Number | Name | Date |
| --- | --- | --- |
| 1,520,421 | Kolar | Dec. 23, 1924 |
| 1,989,823 | Raabe | Feb. 5, 1935 |
| 2,129,914 | Davis | Sept. 13, 1938 |
| 2,240,050 | Nuebling | Apr. 29, 1941 |